(12) United States Patent
Berengoltz et al.

(10) Patent No.: US 9,037,868 B2
(45) Date of Patent: May 19, 2015

(54) SYSTEM AND METHOD FOR PROTECTING INFORMATION AND RELATED ENCRYPTION KEYS

(75) Inventors: Pavel Berengoltz, Petah-Tikva (IL); Leonid Dorrendorf, Maale Adumim (IL); Ido Keshet, Zichron Yaakov (IL)

(73) Assignee: SAFEND LTD., Tel Aviv (IL)

( * ) Notice: Subject to any disclaimer, the term of this patent is extended or adjusted under 35 U.S.C. 154(b) by 128 days.

(21) Appl. No.: 13/376,808

(22) PCT Filed: Jun. 10, 2010

(86) PCT No.: PCT/IL2010/000461
§ 371 (c)(1),
(2), (4) Date: Feb. 9, 2012

(87) PCT Pub. No.: WO2010/143191
PCT Pub. Date: Dec. 16, 2010

(65) Prior Publication Data
US 2012/0137140 A1    May 31, 2012

Related U.S. Application Data

(60) Provisional application No. 61/186,049, filed on Jun. 11, 2009.

(51) Int. Cl.
*G06F 21/00* (2013.01)
*G06F 21/62* (2013.01)
*G06F 21/31* (2013.01)
*H04N 21/442* (2011.01)
*H04N 21/443* (2011.01)
*H04N 21/466* (2011.01)

(52) U.S. Cl.
CPC ............... *G06F 21/62* (2013.01); *G06F 21/31* (2013.01); *H04N 21/44218* (2013.01); *H04N 21/44231* (2013.01); *H04N 21/4436* (2013.01); *H04N 21/4667* (2013.01); *G06F 2221/2107* (2013.01); *G06F 2221/2137* (2013.01); *G06F 2221/2143* (2013.01)

(58) Field of Classification Search
CPC . G06F 2221/21; G06F 21/6209; G06F 21/62; G06F 21/60; G06F 2221/207
USPC .......................... 713/189, 168; 380/201, 281
See application file for complete search history.

(56) References Cited

U.S. PATENT DOCUMENTS

| | | | |
|---|---|---|---|
| 2002/0114461 A1* | 8/2002 | Shimada et al. | 380/201 |
| 2004/0052379 A1* | 3/2004 | Nishimoto et al. | 380/281 |
| 2004/0073792 A1* | 4/2004 | Noble et al. | 713/168 |
| 2004/0091114 A1 | 5/2004 | Carter et al. | |
| 2005/0111664 A1 | 5/2005 | Ritz et al. | |
| 2007/0088947 A1 | 4/2007 | Cross et al. | |

OTHER PUBLICATIONS

International Search Report mailed on Oct. 22, 2010, for PCT International Application No. PCT/IL2010/000461.

* cited by examiner

*Primary Examiner* — Syed Zaidi
(74) *Attorney, Agent, or Firm* — Pearl Cohen Zedek Latzer Baratz LLP

(57) ABSTRACT

A system apparatus and method for protecting information are provided. Embodiments of the invention may detect inactivity related to a computing device. Information and encryption key may be removed from a memory. Subsequent activity may be detected. An authentication procedure may be performed, and, contingent on authenticating a relevant entity, a master key may be generated and installed in a memory.

18 Claims, 3 Drawing Sheets

SYSTEM AND METHOD FOR PROTECTING INFORMATION AND RELATED ENCRYPTION KEYS

CROSS-REFERENCE TO RELATED APPLICATIONS

This application is a National Phase Application of PCT International Application No. PCT/IL2010/000461, International Filing Date Jun. 10, 2010, entitled "SYSTEM AND METHOD FOR PROTECTING INFORMATION AND RELATED ENCRYPTION KEYS", published on Dec. 16, 2010, as International Publication No. WO 2010/143191, which claims priority from U.S. Patent Application No. 61/186,049, filed Jun. 11, 2009, both of which are incorporated herein by reference in their entirety.

BACKGROUND OF THE INVENTION

A large and increasing portion of the information handled in today's modern office environment is digital. Many organizations, institutions and establishments store, handle and manipulate most of their information, and/or information associated with their activities, in digital forms. In many cases, such information may include confidential, secret or otherwise sensitive information, which, in the wrong hands, may cause serious damage to the owner or keeper of the information and/or to those associated with the owner and/or keeper of the information.

In many cases, sensitive information may be stored, in encrypted form, on storage devices that may be external or internal to a computing device. Typically, an authenticated user may be provided with a decryption key that may be used to decrypt encrypted information. However, a problem or security risk may arise when an authenticated user, who has obtained a decryption key, is not present in the vicinity of a relevant computing device. In such case, another, possibly hostile user or application may use the relevant computing device to gain access to sensitive information that may be readily available or accessed when a decryption key is present or available, for example, resident in a memory of the relevant computing device. Embodiments of the invention may solve problems and/or risks such as described above.

SUMMARY OF EMBODIMENTS OF THE INVENTION

Embodiments of the invention may enable protecting information on a storage device. Upon detecting inactivity, a master key installed in a memory may be removed from the memory and decrypted information stored in a memory may be removed from the memory. Upon detecting activity, an authentication procedure may be performed and contingent on authenticating a relevant entity, a master key may be generated and installed in a memory.

BRIEF DESCRIPTION OF THE DRAWINGS

Embodiments of the invention are illustrated by way of example and not limitation in the figures of the accompanying drawings, in which like reference numerals indicate corresponding, analogous or similar elements, and in which.

It will be appreciated that for simplicity and clarity of illustration, elements shown in the figures have not necessarily been drawn to scale. For example, the dimensions of some of the elements may be exaggerated relative to other elements for clarity.

DETAILED DESCRIPTION OF EMBODIMENTS OF THE INVENTION

In the following detailed description, numerous specific details are set forth in order to provide a thorough understanding of the invention. However, it will be understood by those of ordinary skill in the art that the invention may be practiced without these specific details. In other instances, well-known methods, procedures, components, modules, units and/or circuits have not been described in detail so as not to obscure the invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like.

Unless explicitly stated, the method embodiments described herein are not constrained to a particular order or sequence. Additionally, some of the described method embodiments or elements thereof can occur or be performed at the same point in time.

Figure 1:
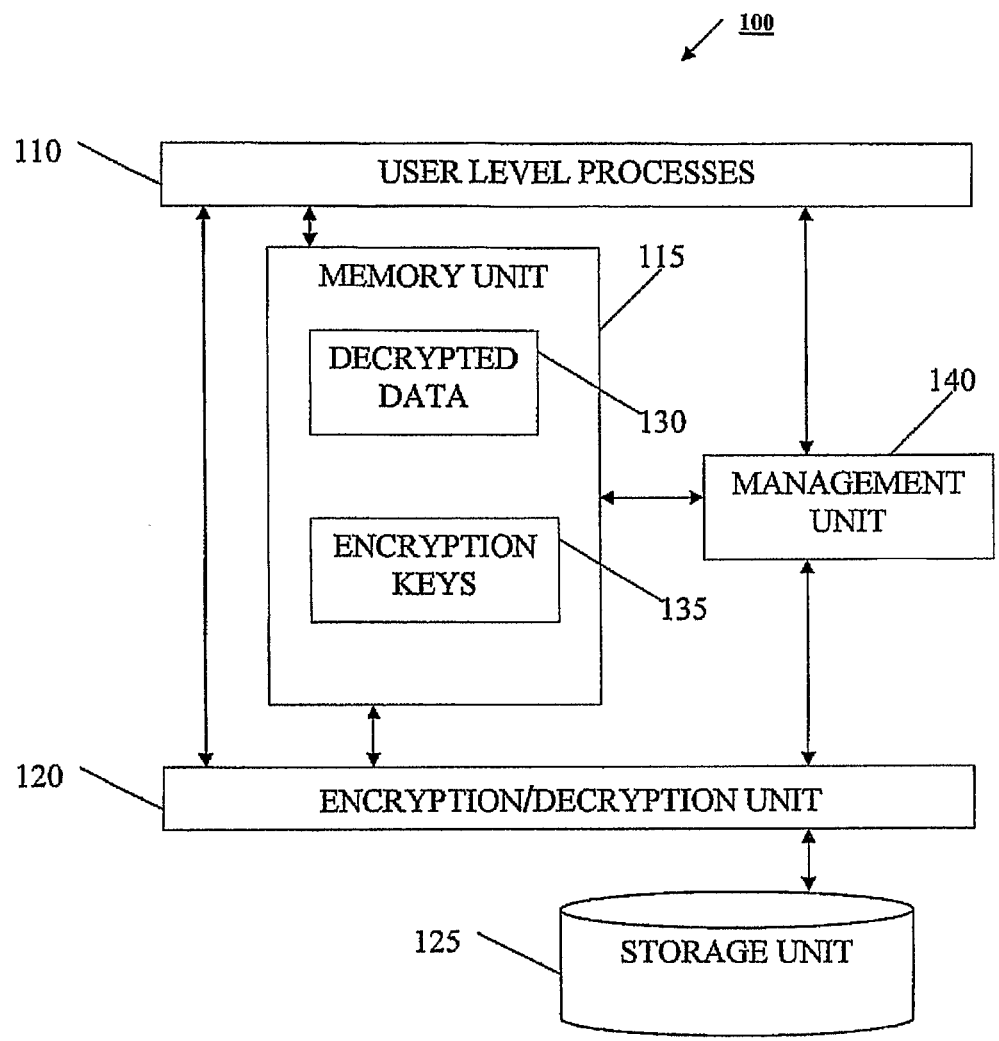
FIG. 1 shows exemplary components of a system that may be used to implement embodiments of the invention.

Reference is made to FIG. 1 showing exemplary components of an exemplary system 100 according to embodiments of the invention. System 100 may comprise user level process 110, memory unit 115, encryption/decryption unit 120, storage unit 125 and management unit 140. It will be noted that some components of system 100 may be or may comprise software while other components may be or may comprise hardware, firmware, software or any combination thereof. User level processes 110 may be any process, task, procedure, application or other execution of executable code. As known in the art, user processes may be subjected to various constraints, e.g., access rights or other permissions. Such constraints may be related to parameters or attributes, accordingly, a user process executing on behalf of a specific user may only access files the specific user is allowed to access. While for the sake of simplicity and clarity only user level processes are shown, embodiments of the invention are not limited in this respect. Kernel level processes, system services or tasks may be similarly included in embodiments of the invention.

Memory 115 may be any suitable memory or a plurality of memory units. For example, memory unit 115 may be or may include, a Random Access Memory (RAM), a Dynamic RAM (DRAM), a Synchronous DRAM (SD-RAM), a Flash memory, a volatile memory, a non-volatile memory, a cache memory, a buffer, a short term memory unit, a long term memory unit. Memory unit 115 may be a storage device, e.g., a hard drive or a universal serial bus (USB) storage device, for example, used in a memory paging system as known in the art.

Encryption/decryption unit 120, for the sake of simplicity referred to as "encryption unit 120" hereinafter may be any applicable unit, module or component. For example, encryption unit 120 may be or may comprise software, hardware, firmware or a combination thereof. Encryption unit 120 may perform various encryption/decryption related tasks. For example, encryption unit 120 may decrypt encrypted information, possibly stored on storage unit 125 and provide such decrypted information to one or more of user level processes 110. Encryption unit 120 may encrypt information, for example, information produced and/or provided by one of user level processes 110. Encryption unit 120 may perform various configuration and/or management functions. For example, encryption unit 120 may manage encryption keys 135 stored in memory unit 115. For example, authenticate users or applications and, possibly contingent on such authentication, enable access to encryption keys in memory unit 115, e.g., by providing a pointer, memory address or other location information.

Storage unit 125 may be any applicable or suitable storage system, device, unit or component, for example, an internal or external hard drive or disk. Alternatively or additionally, storage unit 125 may be or may comprise a random access memory (RAM), a dynamic random access memory (DRAM), a RAM disk, a non-volatile storage chip, a removable storage media, universal serial bus (USB) storage device, network storage device, a FLASH storage device, a backup storage system or any other suitable storage device, media or system. While operatively connected to other components of system 100, storage unit may be geographically distant from such other components. For example, storage unit 125 may be connected to a remote computing device and may be accessed, for example by encryption unit 120, over a network. Although a single block is shown, it will be recognized that storage unit 125 may include a number of storage devices, for example, a number of hard drives, a redundant array of independent disks (RAID) system or a combination of devices, e.g., storage unit 125 may include a number of hard disks, a removable media and a volatile memory device.

As shown by block 130, memory unit 115 may store decrypted data. For example, encrypted information stored on storage unit 125 may be retrieved by encryption unit 120, decrypted and stored in memory unit 115. Such decrypted information may be used by user level processes 110. As shown by block 135, memory unit 115 may store encryption (and/or decryption) keys. For example, encryption/decryption keys required in order to encrypt/decrypt information may be stored by memory unit 115. For example, in one embodiment, encrypted information may be stored in files, such files may contain or be otherwise associated with a respective encryption key, also known in the art as file encryption keys. An encryption or file key may further be encrypted in order to disable unauthorized or other users or entities from using it to gain access to the encrypted information. A master key may be used in order to encrypt and/or decrypt one or more file encryption keys. Accordingly, encryption key 135 may include one or more master keys that may be used by user level processes 110 and/or encryption unit 120 in order to decrypt and/or encrypt file encryption keys described herein.

As shown by the arrow connecting blocks 115 and 120, encryption unit 120 may communicate with memory unit 115, e.g., in order to store decrypted information in memory unit 115 or retrieve decrypted information for encryption. As shown by the arrow connecting blocks 120 and 125, encryption unit 120 may communicate with storage unit 125, e.g., in order to retrieve encrypted information stored thereon, decrypt the information and possibly store it on memory unit 115. Additionally, encryption unit may retrieve decrypted information from memory unit 115, encrypt it and stored an encrypted version of the information on storage unit 125. As shown by the arrow connecting blocks 120 and 110, encryption unit 120 may communicate with user level processes 110. For example, a user process may interact with encryption unit 120 and may, as part of such interaction, be provided with a location or address in memory unit 115 where a master encryption key is stored. Alternatively, management unit 140 may authenticate a user level process, and contingent on such authentication may provide the user level process with reference to a location in memory unit 115. Such reference may contain an encryption key that may be required for decrypting information as described herein. Other procedures, functionalities or services may be provided by encryption unit 120 to user level processes 110. It will be recognized that other interactions, involving other components of system 100 are possible and/or applicable. For example, user level processes may interact with storage unit 125, however, for the sake of simplicity and clarity only some interactions are depicted by arrows in FIG. 1. A person of ordinary skill in the art will recognize that embodiments of the invention are not limited by the number or type of interactions between components of system 100 described herein.

Management unit 140 may be operatively connected to any component of system 100 and may perform, be involved in or be otherwise related to tasks or functions such as, but not limited to, coordination, scheduling, arbitration, supervising and management of various procedures, flows, logic or other aspects of the present invention as described herein. For example, management unit 140 may comprise a software module that may coordinate operations such as installing encryption keys in memory 115, causing encryption/decryption unit 120 to encrypt or decrypt a file etc.

Figure 2:
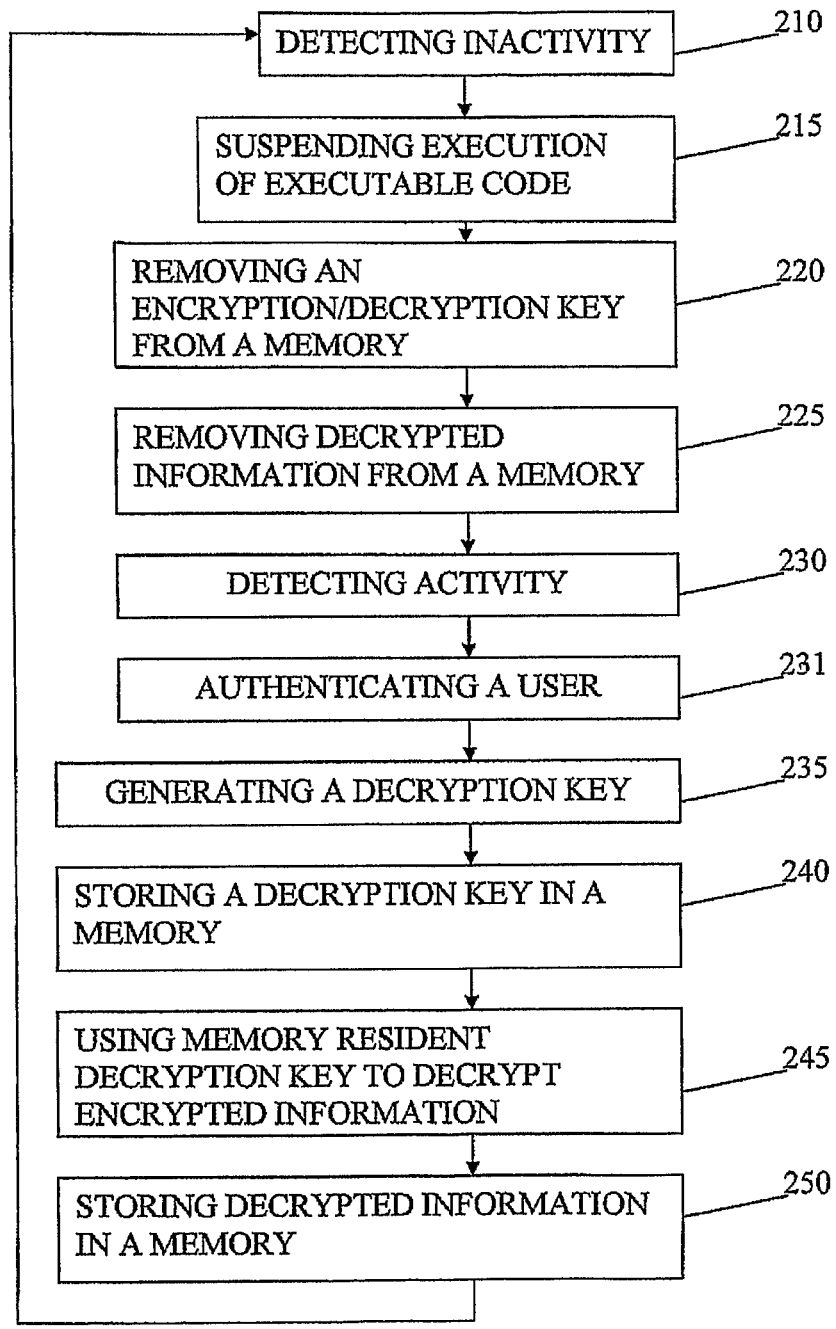
FIG. 2 shows an exemplary flowchart that may be used to implement embodiments of the invention.

Reference is made to FIG. 2 showing an exemplary flow chart that may be related to embodiments of the invention. According to embodiments of the invention and as shown by block 210, the flow may include detecting inactivity or an idle state. As referred to herein, inactivity may relate to any state, operational mode or other relevant aspects related to an operation of a computing device. Inactivity may be detected when a computing device is at least partly inactive, inoperative, unoccupied or unused. For example, when a computing device is locked, in hibernation, standby or sleep mode, is unattended or is otherwise at least partly idle.

Inactivity may be detected by various means. For example, an invocation of an application, e.g., a screen saver, an initiation of a shutdown procedure, an entry to a power save mode or a hard disk sleep state initiation may all be detected and further associated with inactivity by embodiments of the invention as shown by block 210. It will be recognized that any detected or determined state, mode, context or other operational aspects of a computing device may be related with "detecting inactivity" by embodiments of the invention as shown by block 210.

For example, components shown in FIG. 1 may be included in, or related to a computing device, e.g., the computing device described with reference to FIG. 3. In such or other cases, a kernel module (not shown) that may be part of, or associated with management module 140, may be configured to receive or otherwise obtain information from an operating system. For example, such kernel module that may be coupled to an operating system may be notified the operating system when a screen saver is activated. Such information may communicated to management unit 140 and may be interpreted as an indication of lack of user activity and/or lack of user interaction with a relevant computing device, e.g., user has not pressed any key on a keyboard or moved a mouse for a predefined period of time. Accordingly, based on such event or information inactivity may be detected as shown by block 210. Another example may be detecting that a user has logged off. For example, a user operating a first computing device may log on to a second, remote computing device and gain access, to possibly protected and encrypted files, on the second, remote device. Accordingly, when such user logs off the remote device an embodiment of the invention on the second, remote device may determine a period of inactivity (of that user) has begun.

As shown by block 215, the flow may include suspending execution of executable code. Obviously, a suspended from execution task or application (also referred to as a suspended task or application) is unable to access information, e.g., information in a memory or a storage device coupled to a computing device. Accordingly, suspending an execution of an executable code may guarantee that such code (and related application or program) does not access any information, including sensitive, encrypted or decrypted information that may be stored, e.g., in a memory, a storage device or a remote storage system. Suspending execution as described herein may be initiated by management module 140 that may instruct a kernel module to interact with an operating system and cause a suspension of executable code. Management unit 140 may cause selective suspension, e.g., suspension of selected applications, tasks or programs as further described herein.

In one embodiment of the invention all applications, programs, tasks, procedures or any other execution of executable code, e.g., binary code, firmware or scripts may be suspended. While such implementation or configuration may be associated with a high level of security, it may have a down side, as the relevant computing device may be caused to enter a state disabling critical or otherwise required, possibly unrelated, functionalities. For example, suspending administrative, possibly privileged tasks may be undesirable.

In another embodiment of the invention, only selected applications, programs, tasks, procedures or any other execution of executable code may be suspended. Selecting an execution of executable code to be suspended may be according to any applicable or relevant data, information, parameters, indications, rules, thresholds, criteria, settings, configuration, context or other relevant aspects. Such criteria, rules or parameters may be configured by a user, for example, by interacting with management unit 140. Management unit 140 may support, comprise or be associated with any suitable user interface, e.g., graphical user interface (GUI) that may enable a user to configure any applicable parameters, rules, criteria or other configurable aspects of embodiments of the present invention.

For example, in one embodiment, a configuration parameter may determine that only user level processes, e.g., user level process 110, may be suspended. Accordingly, other procedures, applications or possibly scheduled tasks may be enabled to maintain their operational state.

For example, kernel level processes or processes running with system credentials, e.g., services etc may execute or run while user level processes or applications are suspended. Other possible criteria may cause only a subset of user level applications to be suspended while another subset of user level applications are allowed to execute. It will be recognized that suspension of execution of executable code as shown by block 215 may be selective and may be applied to any subset or category of executions without departing from the scope of the invention.

In one embodiment of the invention, selecting to suspend an execution of executable code may be according to past or historical relations or associations of such execution with a specific, possibly encrypted object. For example, if a specific information object such as a file on a hard disk is to be protected by embodiments of the invention, then a list of the applications, program or any other executable code that have accessed such file, for example, since the relevant computing device was last reset or turned on, may be maintained by embodiments of the invention, e.g., by management unit 140. For example, processes that possess a reference related to information included in such file content object. An exemplary reference possessed by an application or program may be a file handle as known in the art or a pointer to a memory location storing, possibly decrypted, information related to such file. Information, parameters or other data enabling embodiments of the invention to determine a task or program possesses such reference may be obtained from an operating system executing on the relevant computing device, for example, by a kernel module described herein.

Accordingly, suspending execution of executable code as shown by block 215 may comprise suspending all programs or applications that have accessed that file during a predefined period of time. Such selective suspension of execution may be device centric, e.g., according to an access to a storage device. For example, suspending all scripts, tasks or programs that have accessed any file on a specific storage device, e.g., an internal hard drive coupled to a computing device. It will be realized that any applicable criteria may be configured and/or used in order to select processes, application or other entities for suspension as shown in block 215.

As shown by block 220, the flow may include removing an encryption/decryption key from a memory. For example, a decryption key may be installed in a memory and may be used by one or more applications to decrypt encrypted information. Accordingly, removing such decryption key from the memory may disable access to, or decryption of, the encrypted information.

In some embodiments, an information or content object may be associated with an encryption/decryption key. For example, a specific file containing encrypted information may also contain or be otherwise associated with a specific decryption key (also referred to as a "file key" herein). Such specific decryption key may itself be encrypted. Accordingly, in order to decrypt information in such file the encrypted decryption key may first be decrypted and then used to decrypt the encrypted information in the file. In some embodiments, a master encryption/decryption key (also referred to as a "master key" herein), may be used to encrypt/decrypt a plurality of file keys. Accordingly, removing an encryption/decryption key from a memory as shown by block 220 may comprise removing a master key from a memory thus disabling access to a plurality of files. Such disabling may be realized by disabling applications, users or other entities from decrypting the relevant encryption/decryption keys.

A master key installed in a memory may be relevant to, or associated with a specific set of encrypted objects, users or context. Accordingly, removal of encryption and/or decryption keys from a memory may be selective in some embodiments of the invention. For example, a master key related to a selected group, set, subset, type or other categories of files, or other information objects, may be removed from a memory thus disabling further access to the relevant set or type of files or objects. Alternatively or additionally, a master key related to a specific user, user group, privilege or security level may be removed as described herein thus disabling the relevant users, group or class from accessing the relevant files.

As shown by block 225, the flow may include removing of decrypted information from a memory. As known in the art, an application may store information in a memory. Such information may be sensitive encrypted information that may have been decrypted prior to being installed in memory. Such decrypted information may be retrieved, e.g., by a malicious software. Accordingly, possibly upon detecting inactivity as described herein, sensitive or other, possibly decrypted information may be removed from memory thus preventing a security leak. In one embodiment, a cache memory or system may be purged. As known in the art, caching systems may store information in order to expedite its retrieval. According to some embodiments of the invention, some or all relevant cache memories, systems or sub-systems may be purged and information stored therein may be removed and/or deleted. In some embodiments, decrypted information may be stored in, and accordingly removed from a first memory, e.g., a cache memory while an encryption key, e.g., a master key may be stored in, and accordingly removed from a second, possibly different memory or different memory region.

In some embodiments, following a detection and/or determination of inactivity, a removal of sensitive, possibly decrypted, information from memory and a removal of an encryption key from memory as described herein, only limited access to information objects may be possible. For example, programs or applications may only be able to access unprotected, e.g., decrypted or unencrypted files on a storage device. In some embodiments, an application may be enabled to create new files during an inactivity period while no master or other encryption key is installed in a memory. For example, encryption/decryption unit 120 may generate a temporary master key and a file key for a newly created file, encrypt the file's content using the new file key and encrypt the file key using the temporary master key. Such master key may be replaced when normal operation is resumed as described herein. For example, the file key may be decrypted using the temporary master key and re-encrypted using another master key, for example, a re-generated master key replacing the master key removed from memory as described with reference to block 220.

As shown by block 230, the flow may include detecting activity. For example, detecting user interaction with a relevant computing device. Any activity that may require enabling access to files, content or information may be considered as an activity that may cause embodiments of the invention to react. For example, management unit 140 may be configured to determine a relevant activity was detected if a specific application, task or service has been invoked, for example, by an automatic scheduling system, possibly with no user or human intervention. For example, if access to files was disabled as described herein due to lack of user interaction during a predefined period of time then detecting user interaction, e.g., a pressing of a key on a keyboard or a moving of a point and click device may cause management unit 140 to determine that activity was detected and prompt the user for input as described herein.

As shown by block 231, the flow may include authenticating a user. It will be realized that while authenticating a user is shown by block 231, authentication may be relevant or applicable to an application, program or executable code and the discussion herein is applicable to applications as it is to users. Any method or procedure of authentication may be employed as shown by block 231. For example, management unit 140 may prompt a user or application for authenticating parameters.

As shown by block 235, the flow may include generating a decryption key. It will be noted that a decryption key may be associated or even substantially identical to an associated encryption key. According to embodiments of the invention, a key generated as shown by block 235 may be a master key that may be used to decrypt file keys as described herein. Such master or other key may be generated subsequent to an authentication procedure. For example, management unit 140 may prompt a user to enter a secret code, password or other parameter, authenticate the user based on such provided parameter and, contingent on such verification and/or authentication, generate a master or other key. As shown by block 240, a generated decryption key may be installed or stored in a memory. In some embodiments, an encryption/decryption key generated may be based on input provided by a user or program, accordingly, wrong parameters provided, e.g., during authentication described herein may result a generation of an inadequate or otherwise useless key.

Such memory may be accessible to users and/or applications that may retrieve the key and use it to decrypt encrypted information. For example, management unit 140 may generate a key, store it in memory and provide users or applications with a pointer or address of such key. Alternatively or additionally, management unit 140 may provide addressing information related to an encryption/decryption key to encryption/decryption unit 120. Such information may enable unit 120 to decrypt and/or encrypt information. Thus, while a key is not present in memory, encryption/decryption unit 120 may be unable to function, e.g., decrypt encrypted information. When such key is restored and relevant information, e.g., a pointer, is provided to unit 120, encryption/decryption unit 120 may be able to resume full functionality described herein. Accordingly, as shown by block 245, encrypted information may be decrypted, e.g., by encryption/decryption unit 120.

As shown by block 250, decrypted information may be stored in a memory, e.g., memory unit 115. For example, cache memory may store decrypted information. As shown by the arrow connecting blocks 250 and 210, the flow described herein may be repeated.

Figure 3:
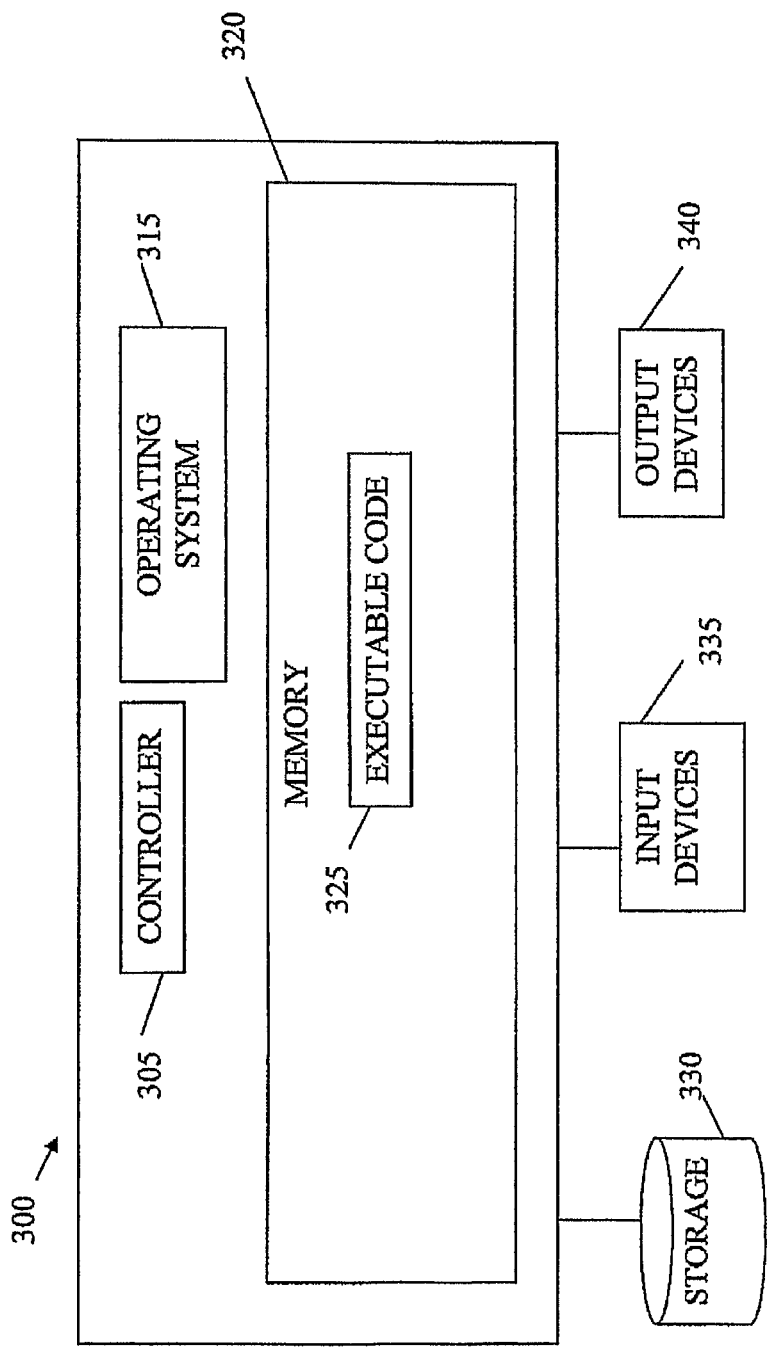
FIG. 3 shows an exemplary computing device according to embodiments of the invention.

Reference is made to FIG. 3, showing high level block diagram of an exemplary computing device according to embodiments of the present invention. Computing device 300 may include a controller 305 that may be, for example, a central processing unit processor (CPU), a chip or any suitable computing or computational device, an operating system 315, a memory 320, a storage 330, an input device 335 and an output device 340.

Operating system may be or may include any code segment designed and/or configured to perform tasks involving coordination, scheduling, arbitration, supervising, controlling or otherwise managing operation of computing device 300, for example, scheduling execution of programs. Operating system 315 may be a commercial operating system. Memory 320 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 320 may be or may include a plurality of, possibly different memory units.

Executable code 325 may be any executable code, e.g., an application, a program, a process, task or script. Executable code 325 may be executed by controller 305 possibly under control of operating system 315. Storage 330 may be or may include, for example, a hard disk drive, a floppy disk drive, a Compact Disk (CD) drive, a CD-Recordable (CD-R) drive, a universal serial bus (USB) device or other suitable removable and/or fixed memory or storage unit.

Input devices 335 may be or may include a mouse, a keyboard, a touch screen or pad or any suitable input device. It will be recognized that any suitable number of input devices may be operatively connected to computing device 300 as shown by block 335. Output devices 340 may include one or more displays, speakers and/or any other suitable output devices. It will be recognized that any suitable number of output devices may be operatively connected to computing device 300 as shown by block 340. Any applicable input/output (I/O) devices may be connected to computing device 300 as shown by blocks 335 and 340. For example, a network interface card (NIC), a printer or facsimile machine, a universal serial bus (USB) device or external hard drive may be included in input devices 335 and/or output devices 340. According to embodiments of the invention, a computing device similar to computing devices 300 may be used to implement embodiments of the invention.

Embodiments of the invention may include an article such as a computer or processor readable medium, or a computer or processor storage medium, such as for example a memory, a disk drive, or a USB flash memory, encoding, including or storing instructions, e.g., computer-executable instructions, which when executed by a computer, processor or controller, carry out methods disclosed herein. For example, a storage medium such as memory 320, computer-executable instructions such as executable code 325 and a controller such as controller 305. Some embodiments may be provided in a computer program product that may include a machine-readable medium, stored thereon instructions, which may be used to program a computer, or other programmable devices, to perform methods as disclosed above.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. A method for protecting content in a computing device, the method comprising:
   encrypting content objects using a plurality of file encryption keys;
   encrypting said file encryption keys using 13 master encryption key;
   installing said master encryption key in a first memory;
   using said master key to decrypt the file encryption keys, and to install the file encryption keys in the first memory;
   detecting inactivity related to a computing device;
   upon detecting inactivity:
      removing said master encryption key from said first memory and selectively removing at least one file encryption key from the plurality of the file encryption keys;
      generating a temporary master key and a new file key for a new content object;
      encrypting the new content object using the new file key and encrypting the new file key by the temporary master key; and
   upon receiving input from an authenticated user, decrypting the new file key using the temporary master key, generating a new master key usable for encrypting and decrypting said new file encryption key, and installing said new master key in said first memory.

2. The method of claim 1, comprising removing decrypted information from a second memory, said second memory storing decrypted information related to said at least one encrypted content object.

3. The method of claim 2, wherein said second memory is part of a cache memory.

4. The method of claim 2, wherein said second memory is operatively connected to one of: said computing device and a remote computing device.

5. The method of claim 1, comprising selectively suspending at least one process executing on one of said computing device and a remote computing device.

6. The method of claim 5, comprising suspending processes that have accessed said at least one encrypted content object.

7. The method of claim 5, comprising suspending processes that possess a reference related to information included in said encrypted content object.

8. The method of claim 1, comprising maintaining at least one file encryption key in said first memory to enable access to at least one encrypted content object.

9. The method of claim 1, wherein said at least one encrypted content object is stored on a storage device operatively connected to one of: said computing device and a remote computing device.

10. The method of claim 1, wherein said inactivity is detected by detecting at least one of: an invocation of a predefined application, a predefined operational state of said computing device and an inactivity period of an input device.

11. The method of claim 1, wherein said input is received using a device selected from the group consisting of: a human interface device, a keyboard, a magnetic card swipe reader and a point and click device.

12. An article comprising a non-transitory computer-readable storage medium, having stored thereon instructions, that when executed on a computer, cause the computer to:
   encrypt content objects using a plurality of file encryption keys to produce an encrypted content object;
   encrypt said file encryption key using a master encryption key;
   install said master encryption key in a first memory;
   use said master key to decrypt the file encryption keys, and to install the file encryption keys in the first memory;
   detect inactivity related to an associated computing device;
   upon detecting inactivity:
      remove said master encryption key from said first memory and selectively remove at least one file encryption key from the plurality of the file encryption keys first memory;
      generate a temporary master key and a new file key for a new content object;
      encrypt the new content object using the new file key and encrypt the new file key by the temporary master key; and
   upon receiving input from an authenticated user, decrypt the new file key using the temporary master key, generate a new master key usable for encrypting and decrypting said new file encryption key, and install said new master key in said first memory.

13. The article of claim 12, wherein the instructions when executed result in:
   removing decrypted information from a second memory, said second memory storing decrypted information related to said encrypted content object.

14. The article of claim 12, wherein the instructions when executed result in selectively suspending at least one process executing on one of: said computer and a remote computing device.

15. The article of claim 14, wherein the instructions when executed result in suspending processes that have accessed said at least one encrypted content object.

16. The article of claim 14, wherein the instructions when executed result in suspending processes that possess a reference related to information included in said encrypted content object.

17. The article of claim 12, comprising maintaining at least one file encryption key in said first memory to enable access to at least one encrypted content object.

18. The article of claim 12, wherein said input is received using a device selected from the group consisting of: a human interface device, a keyboard, a magnetic card swipe reader and a point and click device.

* * * * *